United States Patent
Ditzler et al.

(10) Patent No.: US 11,830,157 B1
(45) Date of Patent: Nov. 28, 2023

(54) GRAPHICAL USER INTERFACE PRESENTING USER-SPECIFIC GARMENT RENDERINGS

(71) Applicant: Amazon Technologies, Inc., Seattle, WA (US)

(72) Inventors: Nicholas Robert Ditzler, Bellevue, WA (US); Nicole C Bishop, Peterborough, NH (US); Anna Demyanik Kalinin, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/806,836

(22) Filed: Jun. 14, 2022

(51) Int. Cl.
| | |
|---|---|
| *G06Q 30/06* | (2023.01) |
| *G06T 19/00* | (2011.01) |
| *G06T 19/20* | (2011.01) |
| *G06F 3/0482* | (2013.01) |
| *G06F 3/0485* | (2022.01) |

(Continued)

(52) U.S. Cl.
CPC .......... *G06T 19/006* (2013.01); *G06F 3/0482* (2013.01); *G06F 3/0485* (2013.01); *G06Q 30/0643* (2013.01); *G06T 19/20* (2013.01); *G06F 3/04845* (2013.01);

(Continued)

(58) Field of Classification Search
CPC .............. G06T 19/006; G06T 2210/16; G06T 2200/24; G06T 19/003; G06T 19/00; G06T 19/20; G06T 2219/2021; G06F 3/0482; G06F 3/04842; G06F 3/04845; G06F 3/0485; G06F 3/04815; G06F 3/0484; G06F 3/0481; G06F 3/017; G06Q 30/0643; G06Q 30/0241; G06Q 30/02
See application file for complete search history.

(56) References Cited

U.S. PATENT DOCUMENTS

| | | |
|---|---|---|
| 5,397,081 A | 3/1995 | Landry et al. |
| 5,680,528 A | 10/1997 | Korszun |

(Continued)

FOREIGN PATENT DOCUMENTS

CN        109669611 A   *   4/2019

OTHER PUBLICATIONS

International Search Report for International Application No. PCT/US2017/020979 dated Jul. 6, 2017.

(Continued)

*Primary Examiner* — Xuemei Zheng
(74) *Attorney, Agent, or Firm* — Knobbe Martens Olson & Bear LLP

(57) ABSTRACT

Systems and methods are described for generating and displaying user-specific garment renderings. For instance, a graphical user interface may be presented that includes an initial depiction of a user wearing a first garment in a first display position and a depiction of a next garment at a second display position. In response to a scroll or similar indication, a visual transition and updated user interface may result in presentation of an updated depiction of the user at the first display position, where the updated depiction shows the user wearing the next garment. The updated user interface may additionally include one or more further garments, separate from the user's body depiction, that may be interacted with to request a preview of those one or more additional garments on the depiction of the user within the user interface.

17 Claims, 6 Drawing Sheets

(51) Int. Cl.
*G06Q 30/0601* (2023.01)
*G06F 3/04845* (2022.01)

(52) U.S. Cl.
CPC ...... *G06T 2200/24* (2013.01); *G06T 2210/16* (2013.01); *G06T 2219/2021* (2013.01)

(56) References Cited

U.S. PATENT DOCUMENTS

| | | | |
|---|---|---|---|
| 5,937,081 | A | 8/1999 | O'Brill |
| 7,472,077 | B2 | 12/2008 | Roseman et al. |
| 7,685,074 | B2 | 3/2010 | Linden et al. |
| 8,122,020 | B1 | 2/2012 | Donsbach et al. |
| 10,019,779 | B2 | 7/2018 | Lee et al. |
| 10,026,176 | B2 | 7/2018 | Davidson et al. |
| 11,544,884 | B2 * | 1/2023 | Shuvi ...................... G06N 3/04 |
| 2012/0265644 | A1 | 10/2012 | Roa et al. |
| 2013/0259374 | A1 | 10/2013 | He et al. |
| 2013/0339198 | A1 | 12/2013 | Gray et al. |
| 2014/0137052 | A1 | 5/2014 | Hernandez et al. |
| 2014/0176565 | A1 | 6/2014 | Adeyoola et al. |
| 2014/0225978 | A1 | 8/2014 | Saban et al. |
| 2014/0358737 | A1 | 12/2014 | Burke |
| 2016/0202885 | A1 * | 7/2016 | Park ...................... G06F 3/017 715/810 |
| 2017/0004568 | A1 * | 1/2017 | Radner ............... G06F 3/04883 |
| 2017/0216718 | A1 | 8/2017 | Polzin |
| 2017/0352092 | A1 * | 12/2017 | Mitchell ............... G06T 15/503 |
| 2018/0143756 | A1 * | 5/2018 | Mildrew ............... G06T 19/003 |
| 2021/0065418 | A1 * | 3/2021 | Han ......................... G06T 7/73 |

OTHER PUBLICATIONS

Hardesty, Larry, "How computer vision will help Amazon customers shop online" Amazon Science, Jun. 5, 2020.
Neuberger, Assaf, "Image Based Virtual Try-on Network from Unpaired Data", Amazon Lab126, CVPR 2020, Jun. 14, 2020.
Wiggers, Kyle, "Amazon's new AI technique lets users virtually try on outfits" VentureBeat, Jun. 5, 2020.

* cited by examiner

GRAPHICAL USER INTERFACE PRESENTING USER-SPECIFIC GARMENT RENDERINGS

BACKGROUND

There are a variety of user experiences offered by different online shopping services for enabling users to browse garments or clothing items available for purchase. Typically a user may be shown a stock image of a garment item, such as a shirt or dress, along with information about the item, such as available sizes. While some efforts have been made to present a preview or rendering of how a given garment may appear when worn by a specific user or on a body similar to the user's body proportions, there are challenges in accurately presenting visually how a particular garment or set of garments would look when worn by a particular person.

BRIEF DESCRIPTION OF THE DRAWINGS

Embodiments of various inventive features will now be described with reference to the following drawings. The drawings are provided to illustrate example embodiments described herein and are not intended to limit the scope of the disclosure.

DETAILED DESCRIPTION

Generally, aspects of the present disclosure relate to user-specific garment renderings and, in particular, to displaying renderings of selected garments moving on and off of a depiction of a user based on user interaction. In some cases, a client device may transmit requests for components of user-specific renderings of garments to a garment system. These user-specific rendering of garments may each depict the same user of the client device wearing a different garment of potential interest to the user. For instance, the client device may request composite images of a user image (e.g., a photograph of the user) and garment images (such as images of different shirts, pants, or other garments that the user is interested in potentially purchasing) and display the composite images in an interactive user interface, as the composite images are received from the garment system. In this manner, the client device and garment system may reduce network traffic and computations to generate and display user-specific garment images for only specific garments requested by a user. Moreover, the particular sequence of displaying composite images may display base garment images relative to an existing rendering (such as a user image), so that a user may understand the appearance of the base garment relative to the user image.

As will be appreciated by one of skill in the art in light of the present disclosure, embodiments disclosed herein improve the ability of computing systems, such as cloud-hosted computing systems, to provide and display user-specific garment renderings. Moreover, the presently disclosed embodiments address technical problems inherent within such computing systems, such as addressing the difficulties in providing user-specific garment renderings to a user in a manner that enables a backend computing system with sufficient computing time to generate renderings or composite images dynamically without negatively affecting the user experience on the frontend. These technical problems are addressed in various manners described herein including a cloud-hosted computing system configured to provide renderings of a user wearing particular garments and client-side software to control how components of renderings are displayed interactively on a display of a client device for a user to view in a manner that appears to dynamically generate content in response to user scroll or swipe actions (in some embodiments herein, a swipe may be considered a form of scrolling action). Thus, the present disclosure represents an improvement on computing systems in general, and particularly in the network configurations described as examples herein.

The foregoing aspects and many of the attendant advantages of this disclosure will become more readily appreciated as the same become better understood by reference to the following description, when taken in conjunction with the accompanying drawings.

Figure 1A:
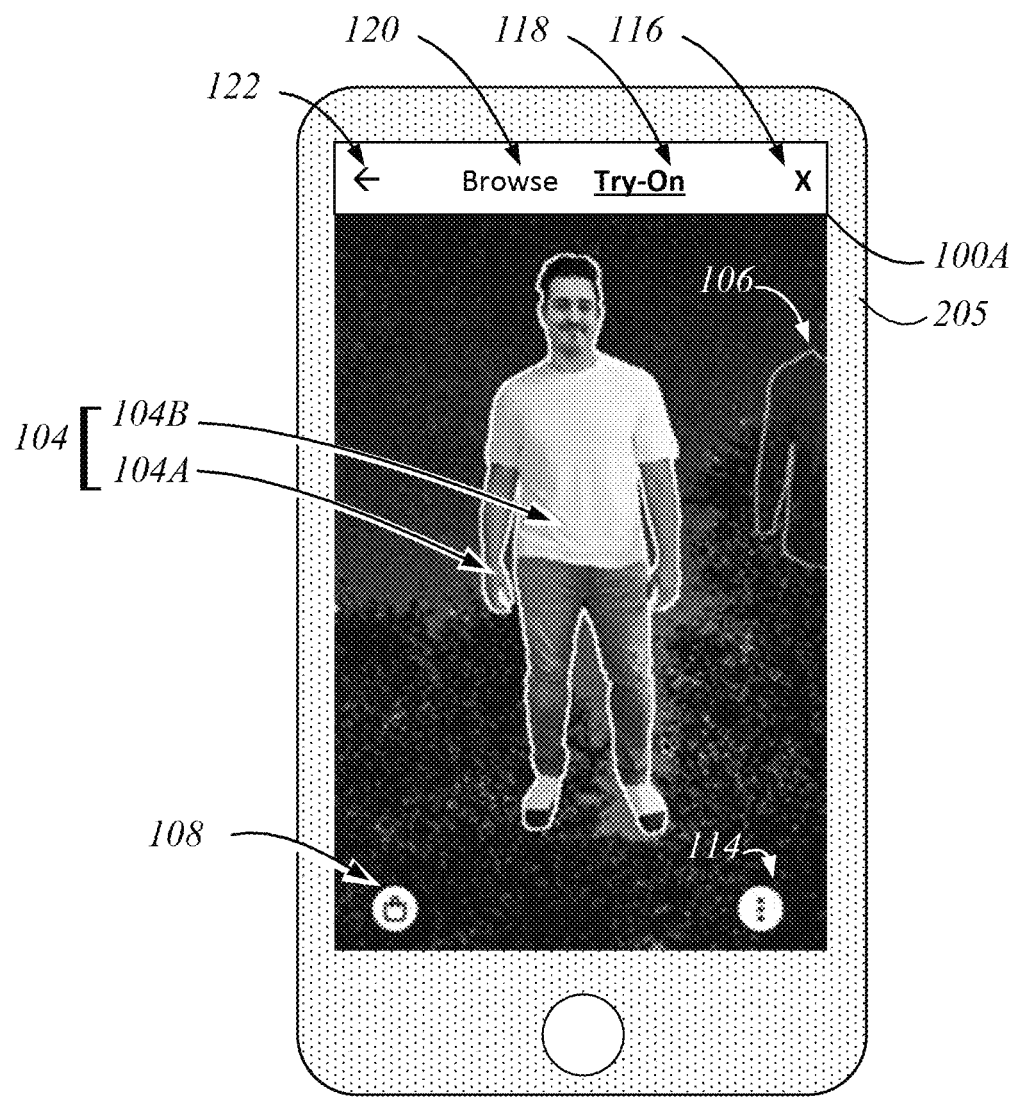
FIGS. 1A-1C illustrate example graphical user interfaces depicting user-specific renderings of garments in a sequence based on user interaction.
Figure 1B:
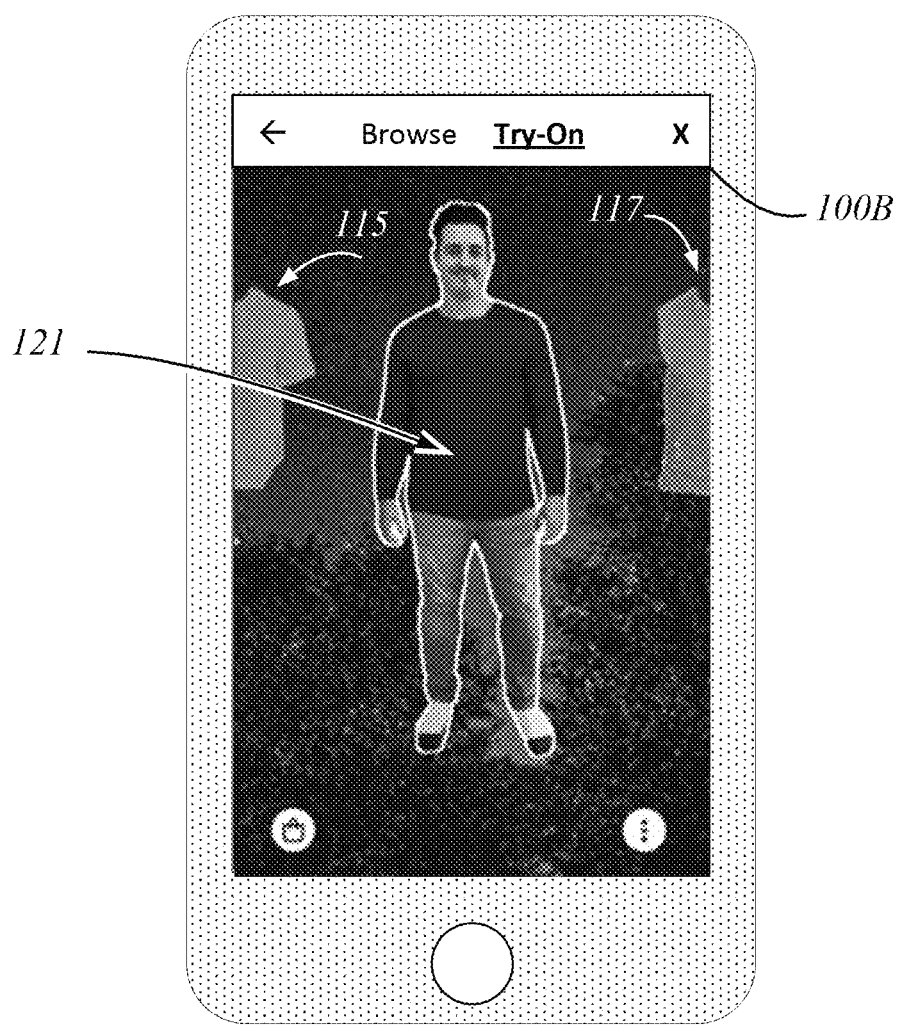
Figure 1C:
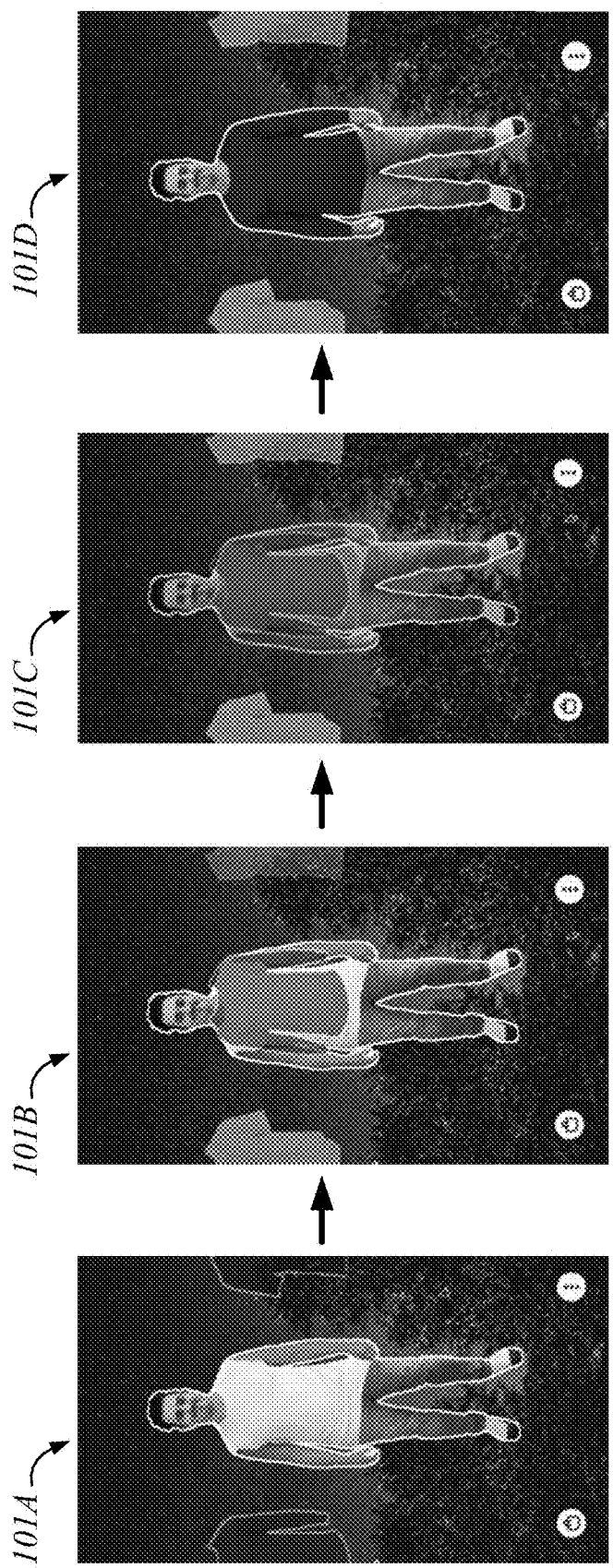

FIGS. 1A-1C depict graphical user interfaces 100A, 100B, and 101A-101D depicting user-specific garment renderings in certain sequences. In some cases, a client device 205 (as will be further described below with reference to FIG. 2) displays graphical user interfaces 100A and 100B (which may be considered the same user interface as one another, shown at different points in time) in sequence in response to user interactions with the user interface. Depending on the embodiments, the user interface instances 100A and 100B may be shown within a webpage displayed by a browser, or may instead be displayed as user interfaces within an application other than a browser (such as a dedicated mobile application or a desktop application associated with a particular retailer or garment manufacturer). In some cases, the client device 205 may request the user-specific garment renderings from a web service hosted by, for example, a garment system 210 (discussed below with reference to FIG. 2). In some cases, the client device 205 may generate the user-specific garment renderings (e.g., using machine learning functions hosted on the client device).

Generally, the client device 205 may obtain a set of renderings of a set of user-specific garments in accordance with a user image and a set of garments. In some embodiments, these may be garments that the user selected by browsing or searching an electronic catalog of garments available for purchase. In other embodiments, the garments may be recommended by a recommendation service to the user rather than specifically selected by the user. The client device 205 may then display the set of renderings of the set of user-specific garments in accordance with user inputs.

For instance, the client device 205 may display, in the first graphical user interface 100A, a first rendering 104 from the set of renderings of a first user-specific garment from the set of user-specific garments. The first rendering 104 may include a user image 104A with a first user-specific garment image 104B for a first user-specific garment (in this case, a shirt). The user image 104A may be a photograph of the user provided by the user of the client device 205 and/or obtained by a camera of the client device 205. The user image 104A may depict a body of the user and optionally the face of the user. The first user-specific garment image 104B may be an image generated from a base garment image to graphically depict how a user-specific garment may appear on the body of the user. The base garment image may be associated with a particular garment (e.g., a specific shirt design) of the set of garments. The base garment image may be an image of a default version of the first garment (e.g., small, medium, or large versions). The base garment image may be an image of the first garment from a first perspective (e.g., facing a camera).

In some cases, the first graphical user interface 100A may include additional elements, such as a background image and/or a first base garment image 106 of a different garment from the set of garments. The first graphical user interface 100A may also include various control elements such as a cart link 108, a setting element 114, an exit element 116, a toggle element between a browsing element 120 and a digital try on element 118, and back element 122. The cart link 108 may be user selectable to navigate to a different webpage (in a browser) or graphical user interface (in an application) to view information associated with a shopping cart. The setting element 114 may be user selectable to navigate to a different webpage (in a browser) or graphical user interface (in an application) to view information associated with settings of the first graphical user interface 100A (e.g., user data, and the like). The exit element 116 may be user selectable to navigate to a different webpage (in a browser) or graphical user interface (in an application) to exit the first graphical user interface 100A, such as to return to a different manner of browsing an electronic catalog. The toggle element may allow a user to toggle between a browsing portion (e.g., to select the set of garments) of website or application via browsing element 120 and the first graphical user interface 100A via the digital try on element 118.

In response to a user input on a non-active element (e.g., browsing element 120 when in the first graphical user interface 100A, the digital try on element 118 when in the browsing portion), the client device 205 may toggle to the non-active element (e.g., it becomes active and is displayed, and the other becomes non-active). The back element 122 may be user selectable to navigate to a different webpage (in a browser) or graphical user interface (in an application) to view information associated with a previous webpage of the website or a previous graphical user interface of the application. In some embodiments, the user interface may include additional options not shown in the figures, such as a user selectable option to change the background of the graphical user interface 100A (e.g., to select from preset background images or for the user to provide an image file to be used as the background image behind the user's body image and the scrollable garment images).

In some cases, the first rendering 104 may be displayed in an initial interactive graphical user interface after a loading graphical user interface was presented to the user. In some cases, the first rendering 104 may be displayed for the first garment as it is the first rendering received from the garment system 210 or generated by the client device 205. For instance, to avoid delay or save computations, the client device 205 may request garment renderings and display renderings on an as-available basis. As an example, in a selection graphical user interface (not displayed), accessible via the browsing element 120, a user may select garments, via user inputs, to be displayed on the user image 104A. As each garment is selected (e.g., in response to these individual selections), the client device 205 may transmit a garment rendering request to the garment system 210. The garment system 210 may receive the garment rendering request and obtain/generate the component(s) of renderings, such as the user image 104A (from a memory), base garment image(s), user-specific garment images, and/or composite images (e.g., of user image and user-specific garment images). The garment system 210 may transmit, on an as-available basis, the components of renderings to the client device 205.

Thus, in this manner, the client device 205 may request, and the garment system 210 may provide, user-specific garment renderings without incurring additional computations or network traffic by communicating garments of interest to a user at a given moment. In this manner, the garment system 210 may avoid generating user-specific garments for thousands or millions of users and thousands of garments. In a similar manner, the network messages may be limited to requests (e.g., user ID and garment ID pairings) and components of renderings for garments of interest to a user in a given moment. In a similar manner, the first base garment image 106 may be displayed (e.g., selected) as a next available garment component is available. In the case more than two garments are ready to be displayed (e.g., multiple components arrive from the garment system 210 before the landing graphical user interface is displayed), the client device 205 may select which garment to display first as the first rendering 104 and which to display as the first base garment image 106 (e.g., in accordance with when a user selected them or indicated a preference).

The client device 205 may then receive a user input indicating a selection of a different garment of interest (such as another of the garments that the user previously selected as a garment of potential interest to purchase). For instance, the user input indicating the selection of the different garment may be programmatically defined to distinguish it from other user inputs that indicate other actions (e.g., zoom in or out on image, rotate perspective of object in image, and the like). In some cases, the user input indicating the selection of the different garment may be tap (or click) on a portion of the graphical user interface 100A, a swipe from a first portion to a second portion of the graphical user interface 100A, a multi-input touch gesture, a selection of a scroll indicator or graphical arrow icon, among others. In some embodiments, the scroll indication, touch gesture, swipe gesture, or other input may generally represent or indicate that the user desires to "drag" or move the garment 106 towards or on to the center user image 104A. Such input mechanism may generally be established within the user interface, and be known to the user, to represent that the user can virtually drag or otherwise move garments that are presented to either side of the user image 104A into the user image 104A in a manner similar to moving clothing items on or off of a virtual version of the user that resembles a flat paper doll (e.g., the appearance of a user's photograph printed on paper, and the paper cut out with rough edges similar to a paper doll cutout). Methods for generating such a paper cut outline are described in co-owned U.S. patent application Ser. No. 17/806,929, filed concurrently with the present application and entitled "PROGRAMMATIC GENERATION OF OBJECT IMAGES WITH POLYGONAL OUTLINES," the entirety of which is incorporated herein by reference.

In one example, the user input may be a swipe from one lateral side to another lateral side of the graphical user interface 100A, where a length and direction of the swipe (e.g., a distance traversed and an angle of direction, such as a vector of the swipe, may indicate a next garment to display, such as in proportion to a display window of the client device 205 and an ordered list of the set of garments). For instance, the client device may determine a distance traversed, determine a ratio of the distance traversed to the display window (e.g., a number between 0 and 1), determine a number of garments in the ordered list to traverse from a current garment in the ordered list being displayed (e.g., the first garment on the landing graphical user interface is ordered first, a next received garment component is second, and so on) based on the ratio and vector (e.g., left swipe traverses towards first garment, right swipe travers towards last garment of the ordered list, and the like). As another example, in the case the user input is defined as a tap, the next garment to be brought into view may be randomly selected. Thus, the client device 205 may determine a second user-specific garment to display from the set of user-specific garments based on the user input.

FIG. 1B displays an updated user interface 100B in response to user input received relative to user interface 100A. In this example, the user may have started a scrolling, dragging, or similar gesture or other selection within the user interface 100A to move or cycle through available garment options that may be dropped, dragged or otherwise moved onto or near the user image 104A to request to view the given centered garment rendered on the user image. The client device 205 may display a second rendering from the set of renderings of the second user-specific garment that the point when the user stops the movement gesture or similar scrolling or other navigation mechanism. In particular, the client device 205 may first display a transition graphical user interface (showing the garment 106 in a faded out or translucent manner over the user image, but not yet shown "on" the user image, as will be discussed with reference to FIG. 1C below), then the second graphical user interface 100B in which the garment 106 is rendered to appear on the user's body as though the user is actually wearing the garment that the user moved onto the body image within the user interface (such as after a threshold time period that scrolling or dragging by the user has stopped).

In a transition graphical user interface (to be further discussed below) before showing user interface instance 100B, the client device 205 may dynamically display a base garment image corresponding to a second user-specific garment overlayed on the first rendering 104. Other elements of the transition graphical user interface 100B may be the same as the first graphical user interface 100A but that the transition graphical user interface 100B may also display second base garment 115 and third base garment 117 (corresponding to a third garments of the set of garments). In this manner, the client device 205 may display the base garment image in relative size, shape, and location as the first rendering 104 so that a user may be informed of a relative appearance and style of the second garment in comparison to the user image 104A before a user sees a user-specific garment image for the second garment. Moreover, in this manner, a user may be informed a relative sequence of garments to view by a scrolling effect of the second base garment 115 and the third base garment 117.

In some cases, the client device 205 may show several different garments in the locations of second base garment 115 and third base garment 117 before applying a visual appearance of "snapping to" second base garment 115 and third base garment 117, depending on how many garments are skipped to display the second garment (e.g., of an ordered list) by a continuous or quickly repeated scrolling or dragging motion without a threshold pause in such input. In some cases, the second base garment 115 and third base garment 117 are adjacent to each lateral side of the centered clothed body rendering 121. In some cases (not depicted), the second base garment 115 and third base garment 117 are adjacent to each top and bottom side of the rendering 121, are adjacent to opposite diagonals of the rendering 121, are adjacent to diagonals (e.g., on a same edge) of the first rendering 121, or other arrangement.

The second rendering 121 of FIG. 1B may include the user's body (e.g., in which the portions of the user's face and body visible around the new garment are the same as user image 104A) and a second user-specific garment image. Accordingly, portions of a face and body of the user may appear fixed and visually unchanged between successively displayed composite images (e.g. the face, hands, legs and feet of the user in the given example), while one or more garments are visually swapped out or changed. Similar to the first user-specific garment image of FIG. 1A, the second user-specific garment image of FIG. 1B may be an image generated from a base garment image to graphically depict how a user-specific garment (e.g., custom dimensions to the user as manufactured in physical reality) may appear on a body of a user. Thus, in this manner, the client device 205 may display the user-specific garment image as second rendering 121 after displaying the overlaid base garment image 106, and the user may be informed of a style and general appearance of the garment in relative size, location, and orientation.

In some embodiments, portions of an updated rendering such as second rendering 121 may include changes to portions of the user's body and/or clothing other than the updated garment. For example, the garment system may implement image inpainting or other techniques (such as other deep learning-based approaches) to generate and fill in portions of the user's original body image that would benefit from visual adjustments in view of the newly rendered garment, such as filling in portions of the user's arms, legs and/or shoes that were covered by real clothing in the user's original photograph (e.g., when the user was wearing a long sleeve shirt when taking the original photograph, but is now previewing a short sleeve shirt). As another example, the garment system may change one or more of the garments from the original photograph to better match the selected garment being previewed, such as to swap in dress shoes when previewing formal clothing.

The client device 205 may subsequently receive additional user inputs. For instance, the client device 205 may receive user inputs to select different selections of garments (causing further transmission to and from the garment system 210), different selections of garments to view, and/or to exit. In some embodiments, the set of garments available to scroll or navigate through may be limited to a previously selected set (e.g., previously added to a set by the user or a recommendation service). In other embodiments, as a user nears the end of the set of garments via scrolling or other input, additionally garments may be dynamically loaded by the client device and requested for caching by the client device from garment system 210 in anticipation of the user reaching the end of the current garment set.

FIG. 1C illustrates a sequence of user interfaces 101A-101D (or a single user interface at different points in time) that may be displayed in response to a user swipe or scroll action, in some embodiments. As shown, the center user body image of user interfaces 101A- 101D gradually transitions from wearing a white sleeveless shirt in user interface 101A to wearing a dark long sleeve shirt in user interface 101D. The transition from user interface 101A to user interface 101B may occur as a result of a right to left swipe (e.g., from a touch screen interaction) or scroll indication (e.g., from a cursor drag motion, arrow key press on a keyboard, or the like) from a user. The user interface may then transition to user interface 101C after a threshold time period (e.g., a preset number of milliseconds) in which the user has stopped the scroll indication, which may be treated by the client device as an indication that the scrollable garment currently overlapping the user's body image should be rendered onto the body. User interface 101C may be one point during a gradual crossfade effect ending in user interface 101D. For example, a visual transition may be applied between user interfaces 101B and 101D that includes (a) a crossfade effect replacing the initial depiction of the user's body wearing a first garment with an updated depiction of the user wearing a second garment that was previously presented to the right of the body, (b) the stand-alone depiction of the second garment fading out as the new rendered body wearing the second garment fades in, and optionally (c) the depiction of the previously worn garment fading in as a stand-alone garment image to the left of the user's body. Thus, the visual transition may include at least three fades occurring simultaneously: (1) the initial depiction of the user wearing a prior garment fading out, (2) the updated composite depiction of the user wearing the next garment fading in, and (3) the depiction of the first garment fading out. Additionally scrollable garment images to the left and right of the user's body depiction may also fade in and out with corresponding timing.

Figure 2:
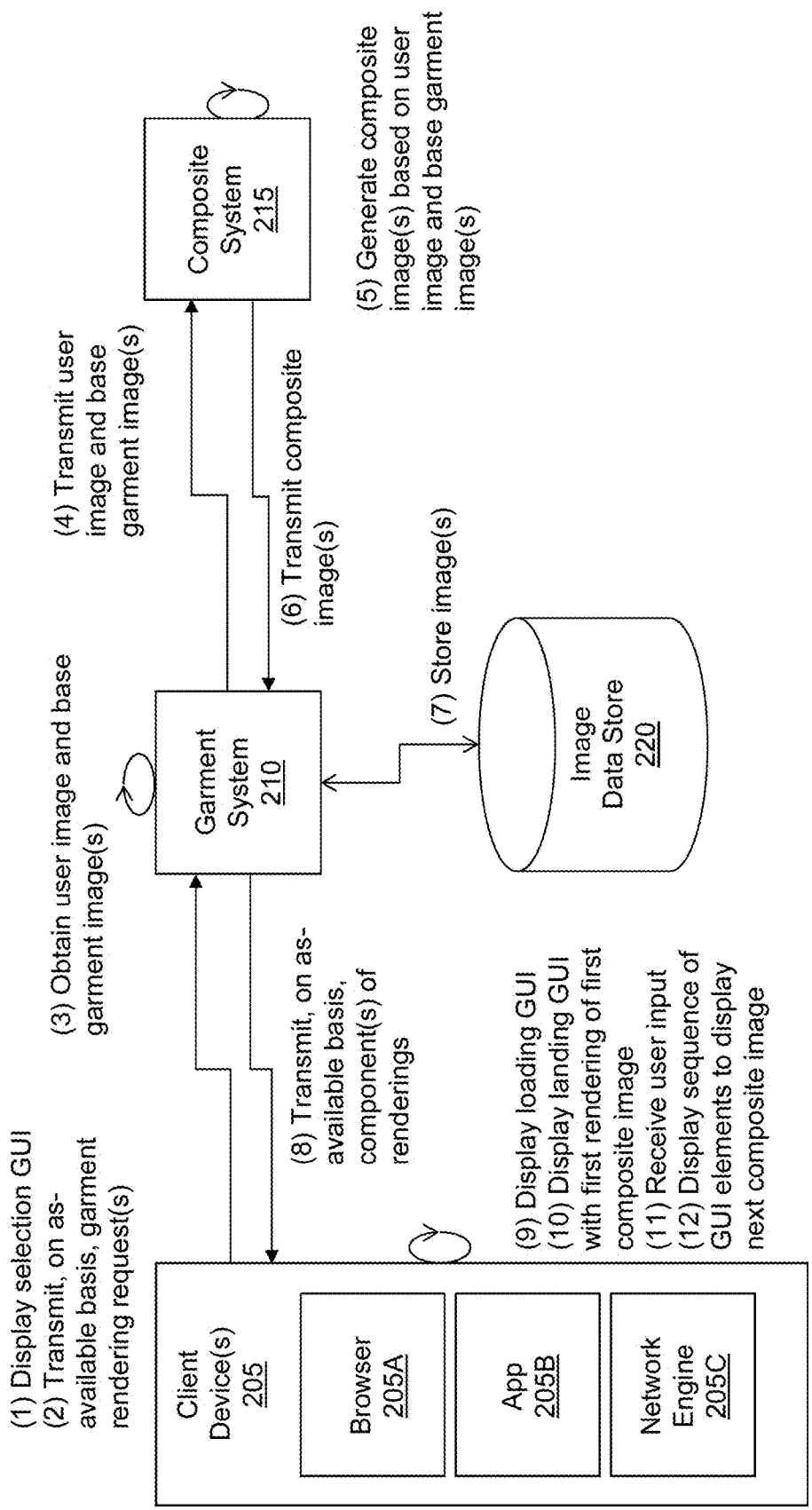
FIG. 2 is a block diagram depicting an illustrative environment in which a client device and a garment system interact to display user-specific garment renderings via an interactive user interface.

FIG. 2 is a block diagram depicting an illustrative environment 200 in which client device(s) 205 and a garment system 210 interact to display user-specific garment renderings. The garment system 210 may be associated with an e-commerce website or retailer to provide user-specific garments and/or user-specific garment renderings. For example, the garments may be standard-sized garments (such as garments available for purchase from a retailer in premade sizes, such as Small, Medium and Large) or the garments may be garments available for custom or bespoke manufacturing in a made-to-order or custom-tailored fashion to specifically fit a given customer. The garment system 210 may interact with the client device(s) 205 (which may be operated by customers). An operator of the garment system 210 may generally accept orders for such garments for mailing to customers. In particular, the environment 200 may include the client device(s) 205, the garment system 210, a composite system 215, and an image data store 220. The client device(s) 205, the garment system 210, the composite system 215, and the image data store 220 are in communication with each other via a network, such as the Internet.

The client device(s) 205 (hereinafter referred to as "client device 205" for ease of reference) can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The garment system 210 may provide the client device 205 with one or more user interfaces, command-line interfaces (CLI), application programing interfaces (API), and/or other programmatic interfaces for viewing and selecting garments and for displaying user-specific garment renderings for the selected garments.

Generally, the client device 205 may include a browser 205A and/or an application 205B, and a network engine 205C. The network engine 205C may handle network requests and transmission/receipt of the same for the browser 205A and/or the application 205B. The browser 205A may be an application to navigate, display and interact with websites and web applications, e.g., via the interne or other networks. The browser 205A may display, e.g., webpages of a website associated with the e-commerce website or retailer, so that users of the client device 205 may interact with product listings and the website. The application 205B may be a mobile or desktop application to interact with product listings of the e-commerce website or retailer in a defined manner outside of a webpage/website environment. As discussed herein, the browser 205A and/or the application 205B may display user-specific garment renderings in certain sequences, so that users may view user-specific garments and be informed of style, appearance, and/or approximate fit of the garment in relative size, shape, location, and orientation relative to the user's general body dimensions.

In some embodiments, the client device 205 is a client device associated with a user, a consumer, or a retailer (referred to as "users") associated with a user account. Users may interact with client device 205 to transmit garment rendering requests, view user-specific garment renderings, and (optionally) select user-specific garment for fulfillment. For instance, the client device 205 may execute a browser program or application (e.g., mobile application, desk top application, and the like) so that a user may navigate an e-commerce website hosted, in part, by the garment system 210 or an associated computing system, so as to select garments to view user-specific representations of those garments. In some cases, the client device 205 is associated with an end user (e.g., a user or a customer) so as to view and select user-specific garments for purchase and subsequent delivery to a user mailing address. In some cases, the client device 205 is associated with a retailer (e.g., an intermediary between the garment system 210 and an end user) so that the end user may view and select user-specific garments for delivery to the user (e.g., user address). The user address may be a location the user receives mail, delivery orders, and the like.

The garment system 210 and the composite system 215 may be combined or separate. As shown in FIG. 2, the garment system 210 and the composite system 215 are separate to clarify the operations of each, but one of skill in the art would recognize that the respective functions may be differently arranged. The garment system 210 and the composite system 215 may be hosted in a computing device, a server system, a cloud-hosted computing systems, or the like. The garment system 210 and the composite system 215 may be hosted on the same or separate physical computing devices or same or separate virtual machines, etc. to process requests for custom garments and/or associated meshes.

The garment system 210 may manage interactions with the client device 205. For instance, the garment system 210 may (in part) be a server-side of an e-commerce website and the client device 205 may (in part) be a client-side of the e-commerce website. A user of the client device 205 may have an account with the e-commerce website. As discussed herein, the garment system 210 may generate user-specific garment renderings in response to requests from the client device 205, and provide the renderings to the client device 205. In some cases, the client device 205 may transmit requests for user-specific garments to the garment system 210, and the garment system 210 may cause delivery of the user-specific garment to the user's physical mailing address (which may involve first physically producing the garment in response to an order from a user).

The composite system 215 may interact with the garment system 210 to generate composite images of garments. For instance, the composite system 215 may generate user-specific garment images and combine the user-specific garment images with user images to generate composite images. In some cases, the composite system 215 may generate the user-specific garment images by modifying the base garment images to align and/or match portions of user images, such as by segmenting a photograph of the user to isolate the various body portions and clothing worn in the actual photograph, then warp or otherwise transform a new garment to appropriate proportions and scale for the user's body shape, physique and positioning in the photograph using machine learning. The composite system 215 may also use user data (e.g., height, weight, dimensions, 3D meshes, and the like) to modify the base garment images, in some embodiments. In some embodiments, the composite system may generate the composite images using the Outfit-VITON image-based virtual try-on approach described by Neuberger et al. in the 2020 paper titled "Image Based Virtual Try-on Network from Unpaired Data." Such an approach may include a model that can be trained on a single photograph of the user using a generative adversarial network (GAN), and may effectively generate a geometrically correct segmentation map that alters the shape of a selected garment image to conform to the target user's body image.

The image data store 220 may store user images, composite images, user-specific garment images, base garment images, and the like (referred to as "components" of renderings). The garment system 210 may store the components of renderings in associated with identifying information or metadata, such as user ID and garment ID, in the image data store 220. The image data store 220 may store the components of renderings in structured, semi-structured, or unstructured data structures.

The various communications illustrated in FIG. 2 may communicate via a network, which may include any wired network, wireless network, or combination thereof. For example, the network may be a personal area network, local area network, wide area network, over-the-air broadcast network (e.g., for radio or television), cable network, satellite network, cellular telephone network, or combination thereof As a further example, the network may be a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications (GSM) network, a Code Division Multiple Access (CDMA) network, a Long Term Evolution (LTE) network, or any other type of wireless network. The network can use protocols and components for communicating via the Internet or any of the other aforementioned types of networks. For example, the protocols used by the network may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In accordance with embodiments of the present disclosure, the client device 205, the garment system 210, the composite system 215, and the image data store 220 may cooperate to provide and display user-specific garment renderings. As an example, the garment system 210 may generate and provide user-specific garment renderings to the client device 205, and the client device 205 may display one or more user-specific garment renderings in accordance with particular graphical user interface sequences and user inputs.

In operation (1), the client device 205 may display a selection graphical user interface. In some cases, the client device 205 may display a selection graphical user interface so that a user may browser a digital listing of garments and make selections to view user-specific garment images corresponded to the selected garments.

In operation (2) of FIG. 2, the client device 205 may transmit, on an as-available basis, one or more garment rendering requests. In some cases, the client device 205 may transmit garment rendering requests as a user makes selections of garments to view via the selection graphical user interface. For example, a user may browse or navigate user interfaces that present item information regarding various garments in a standard manner as may be done in traditional electronic catalog browsing and searching interfaces, where the garment items may each be shown with an option to add the garment to a list or set of garments that the user would like to preview on an image of the user's body. In this manner, the garment system 210 may receive requests and start processing (e.g., generating components of renderings) images while a user is making additional selections. In some cases, the user may be required to make a minimum number of selections before proceeding to a loading graphical user interface or landing graphical user interface.

In some cases, the user may be allowed to proceed to the loading graphical user interface or the landing graphical user interface as soon as at least one garment has been selected. As discussed herein, the client device 205 may transmit requests on an as-available basis to reduce delay and avoid computations (e.g., to generate user-specific garment images) by only requesting particular garments for particular users. In some cases, a garment rendering request may include one or more garment IDs (e.g., corresponding to selections of garments via selection graphical user interface), a user ID and/or a user image (e.g., a photograph that the user captured of himself or herself using a camera of the client device 205). In some embodiments, a photograph of the user may be sent only once from the client device, and then stored by the garment system for all subsequent user-specific garment requests for the given user account. The garment rendering request may be formed in accordance with an API of the garment system 210 to request components of renderings of the garments. In some cases, the garment rendering request may indicate whether all selections have been made (e.g., a maximum number of garments have been selected or a request to proceed from a user has been received via a user input). In this manner, the garment system 210 and/or composite system 215 may efficiently manage data (e.g., the user image and related data) by removing the data or persisting the data.

In operation (3), the garment system 210 may obtain a user image and base garment image(s). In some cases, the garment system 210 may retrieve the user image from image data store 220 (e.g., by using a user ID) or extract the user image from the given garment rendering request. The garment system 210 may retrieve the corresponding base garment image(s) (e.g., an image of the given garment that has not yet been customized to the particular user) from image data store 220 in accordance with the garment ID(s) of the request.

In operation (4), the garment system 210 may transmit the user image and base garment image(s) to the composite system 215. In some cases, the garment system 210 may transmit user data (e.g., height, weight, dimensions, 3D meshes, and the like) to the composite system 215 with the user image and base garment image(s). For instance, the user data may be stored in association with the user image and/or provided by the client device 205 in the first garment rendering request.

In operation (5), the composite system 215 may generate composite image(s) based on the user image and the base garment images(s). In some cases, the composite system 215 may generate one or more user-specific garment image(s) for each base garment image, as discussed herein. The composite system 215 may combine the user image and the user-specific garment images into the composite image(s). In the case the composite system 215 does not combine them into composite image(s), the garment system, 210 or the client device 205 may combine the user image and the user-specific garment images to form the composite image(s) (e.g., as the renderings 104 or 128). It would be understood the remaining operations would be substantially similar in the case the composite images are not generated by the composite system 215, as instead the composite system 215 may provide the user-specific garment images. In some embodiments, a full image of the user's body wearing the corresponding garment may be generated and stored in full for each garment, while in other embodiments only the portion of the image that changes for the particular garment (e.g., only the upper body portion of the body for a shirt) may be generated and stored as a component image to be layered on the base body image when later presented to the user. In operation (6), the composite system 215 may transmit the composite image(s) to the garment system 210 as it becomes available.

In operation (7), the garment system 210 may store the generated image(s) in the image data store 220. In some cases, the garment system 210 may store the user image (e.g., if the given image was not previously stored), the user-specific garment image(s), and/or the composite image(s). In some case, the garment system 210 may avoid operations (3) through (6) if a user-specific garment image and/or a composite image already exists in the data store for a combination of a user and a garment, and the garment system 210 may instead retrieve and provide the stored user-specific garment image and/or composite image.

In operation (8), the garment system 210 may transmit, on an as-available basis, component(s) of renderings. In some cases, the garment system 210 may transmit the component(s) of renderings as the composite system 215 generates and provides user-specific garment images and/or composite image(s). In this manner, the garment system 210 may avoid delay on the client device to display a first rendering 104 and provide additional components as the additional components become available. As discussed herein, the components may include the user-specific garment image(s), base garment image(s), and/or composite image(s).

In operation (9), the client device 205 may optionally display a loading graphical user interface. In some cases, the client device 205 may display the loading graphical user interface before displaying the landing graphical user interface while waiting on components for the first rendering 104 from the garment system 210. In some cases, the client device 205 may display the loading graphical user interface after displaying a selection graphical user interface and in response to a threshold number of selections (of garments to view) having been made or in response to a user request to proceed with certain selections. In some cases, the client device 205 may not display the loading graphical user interface if components of the first rendering 104 have been received from the garment system 210 while the selection graphical user interface is being displayed. In some cases, the client device 205 may not display the loading graphical user interface if components of the first rendering 104 and at least one other base garment image, user-specific garment image, or composite image have been received from the garment system 210 while the selection graphical user interface is being displayed. In this case, the client device 205 may proceed directly to displaying a landing graphical user interface.

In operation (10), the client device 205 may display the landing graphical user interface. In some cases, the client device 205 may display the first rendering 104 alone or, as depicted in graphical user interface 100A in FIG. 1A, with the first base garment image 106.

In operation (11), the client device 205 may receive a user input. In some cases, the client device 205 may determine an action based on the user input, such as a user input indicating a selection of a different user-specific garment, or a selection of one of the other elements of the graphical user interface 100A (e.g., to change a background, exit, and the like).

In operation (12), the client device 205 may display a sequence of graphical user interface elements to display a next composite image. In some cases, the client device 205 may determine a next garment to display based on the user input (e.g., based on a direction and length of a swipe), display a transition graphical user interface, and then display a second rendering corresponding to the next garment. For instance, the client device 205 may display the transition graphical user interface (which may interchangeably be considered a transitional effect within the same user interface) with a base garment image for the next image overlaying the first rendering 104, so that a user may view the appearance of the garment in relative size, location, and orientation before viewing the second rendering including the user-specific garment image. In this manner, a user may view visual changes from the base garment image to the user-specific garment image, thereby informing the user of how a physical (e.g., in physical reality) version of the user-specific garment would likely generally appear on the body of the user.

Figure 3:
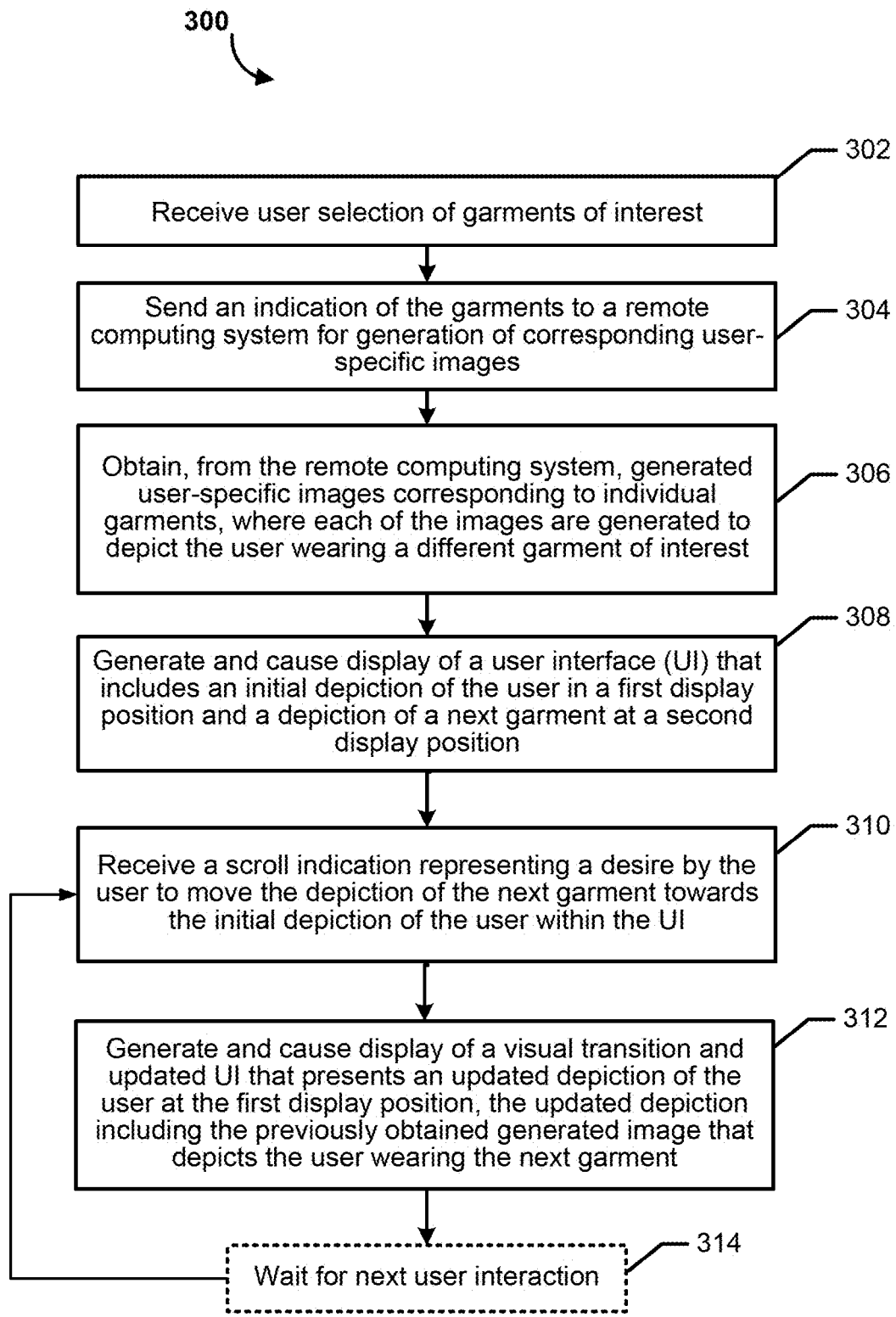
FIG. 3 is a flow chart depicting an illustrative routine for displaying user-specific garment renderings via an interactive user interface.

FIG. 3 is a flow chart depicting an illustrative routine 300 implemented by the client device 205 for displaying user-specific garment renderings, according to some embodiments. The routine 300 may be implemented by the client device 205, but other components of FIG. 2, such as the garment system 210, may perform some operations referenced within the routine 300 for or on behalf of the client device 205. In at least one embodiment, the client device 205 may implement all or portions of the routine 300. For example, the blocks of method 300 may be implemented by operations of a browser 205A (in accordance with software in a script language, such as JavaScript, received by the browser from a server) or operations of a dedicated executable application 205B configured to present various user interfaces.

The illustrative method begins at block 302, where the client device 205 receives user selection of garments of interest to the user. For example, the user may select garments of interest via known item selection interfaces of a retail service of electronic catalog service, such as via search and browse functionality. Alternatively or additionally, one or more of the items of interest may be generated as recommendations for the user without explicit user selection. While not shown in FIG. 3, the client device may additionally obtain a photograph of the user (such as via a camera of the client device, such as in association with a prompt for the user to stand in a specified position and stance) if the garment system has not received and stored a photograph of the user for garment preview purposes previously.

Next, at block 304, the client device 205 sends an indication of the garments to a remote computing system (such as the garment system 210) for generation of corresponding user-specific images. The client device may additionally send the photograph of the user to the remote system, if applicable in the given instance. In some embodiments, indications of the garments of potential interest to the user may be sent asynchronously and/or individually as soon as the user makes each selection, so that the garment system may begin generating composite images prior to when the user finishes making selections. The indication of a garment of interest may be sent, for example, as a unique identifier for the garment item within an electronic catalog, along with any specific properties or metadata that may distinguish different versions of the garment (such as color).

At block 306, the client device 205 obtains, from the remote computing system, generated images corresponding to individual garments, including a first image generated by incorporating a depiction of a first garment with a photograph of the user. As discussed above, the garment system may generate such an image using segmentation, warping and/or machine learning techniques. In some embodiments, the generated images may be returned to the client device on an as-available basis as soon as each one is generated. In other embodiments, the user-specific generated garment images may be returned in batches.

At block 308, the client device 205 generates and causes display of a user interface that includes an initial depiction of the user in a first display position and a depiction of a next garment at a second display position. In the first pass through looping method 300, the next garment may be the first garment for which a composite image is returned from the remote computing system. In some embodiments, the initial clothed depiction of the user may be a cropped version of the actual photograph taken by the user (e.g., wearing the clothes the user was actually wearing when photographed). In other embodiments, the initial depiction of the user may be of the user wearing one of the selected garments (e.g., a generated composite image).

At block 310, the client device 205 may receive a scroll indication representing a desire by the user to move the depiction of the first garment towards the initial depiction of the user within the user interface. For example, this user interaction may be via a touch gesture, such as a swipe (e.g., from a touch screen interaction) or other scroll indication (e.g., from a cursor drag motion, arrow key press on a keyboard, or the like). In subsequent passes through block 310, the scroll indication may be in either direction—e.g., the user may scroll left or right to preview either new garments or revisit garments previously passed.

At block 312, the client device 205 generates and causes display of a visual transition and updated user interface that presents an updated depiction of the user at the first display position. The updated depiction may include the previously obtained generated image that depicts the user wearing the next garment, and may also include a depiction of a new (e.g., second) garment at the second display position instead of the first garment previously presented at the second display position. For example, in one embodiment, a visual transition may be displayed between receiving the scroll indication and updating the user interface, where the visual transition comprises (a) a crossfade effect replacing the initial depiction of the user with the updated depiction of the user at the first display position, (b) the depiction of the first garment fading out as it moves within the user interface towards the first display position, and (c) the depiction of the second garment moving to the second display position. It will be appreciated that different fading effects, animations and other alternatives are possible in other embodiments. For example, a morphing effect or other animated effect could be applied rather than a fade or crossfade effect, in some embodiments.

At block 314, the client device may wait for a next user interaction with the user interface. If another scroll, swipe or similar interaction is detected, the method 300 may return to block 310 to process the interaction, such as to change the depiction of the user to be wearing a third garment of interest to the user. This process may repeat, with the user able to scroll in both directions (such as to revisit garments previously shown), until the user chooses to exit the user interface.

Figure 4:
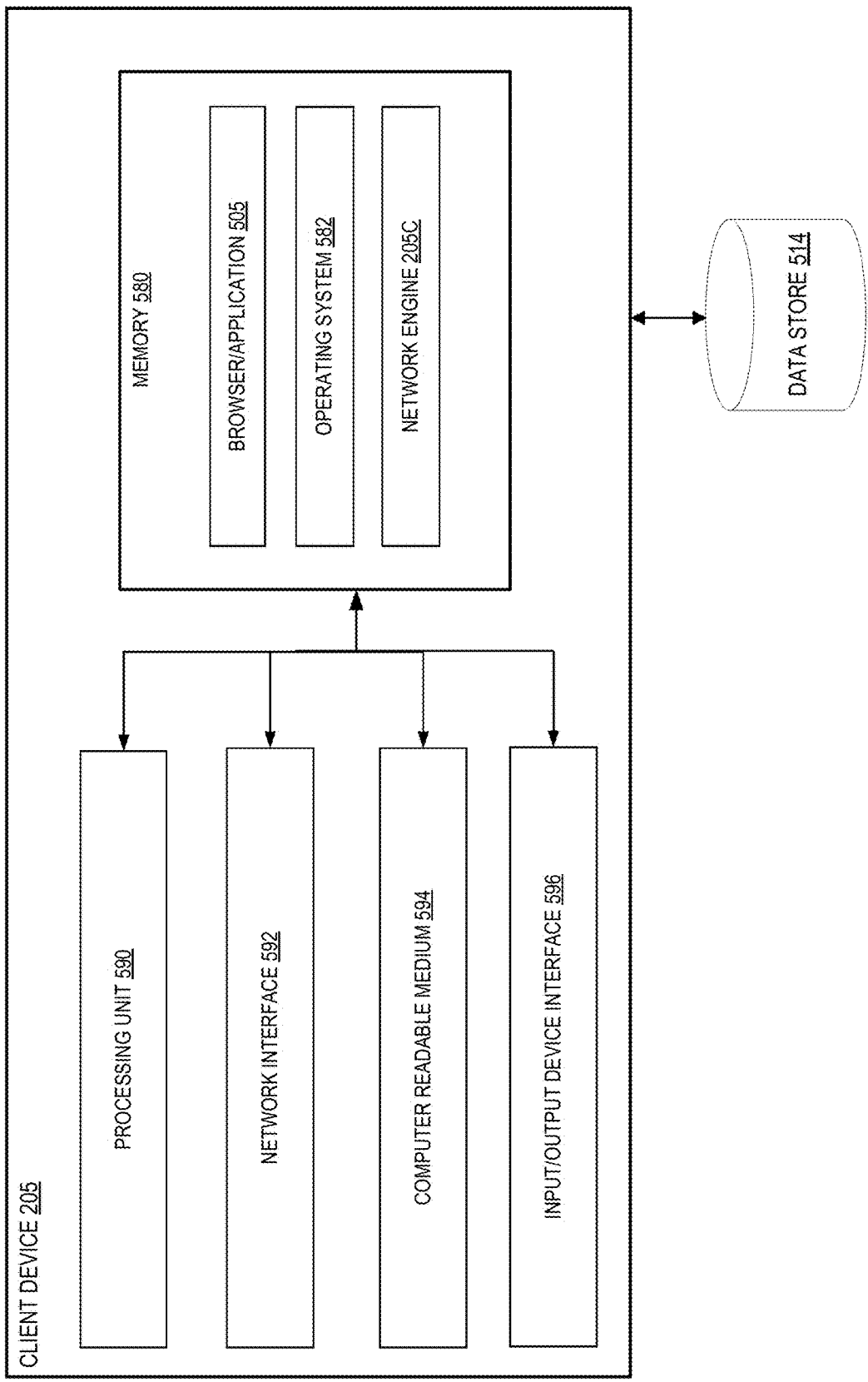
FIG. 4 depicts a general architecture of a computing device configured to implement aspects of the present disclosure.

FIG. 4 depicts a general architecture of a computing system implementing the client device 205 of FIG. 2. The general architecture of the system depicted in FIG. 4 includes an arrangement of computer hardware and software that may be used to implement aspects of the present disclosure. The hardware may be implemented on physical electronic devices, as discussed in greater detail below. The system may include many more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIG. 2 (e.g., the composite system 215, etc.).

As illustrated, the system includes a processing unit 590, a network interface 592, a computer readable medium drive 594, and an input/output device interface 596, all of which may communicate with one another by way of a communication bus. The network interface 592 may provide connectivity to one or more networks or computing systems. The processing unit 590 may thus receive information and instructions from other computing systems or services via the network. The processing unit 590 may also communicate to and from memory 580 and further provide output information for a display (not shown) via the input/output device interface 596. The input/output device interface 596 may also accept input from an input device (not shown).

The memory 580 may contain computer program instructions (grouped as units in some embodiments) that the processing unit 590 executes in order to implement one or more aspects of the present disclosure, along with data used to facilitate or support such execution. While shown in FIG. 4 as a single set of memory 580, memory 580 may in practice be divided into tiers, such as primary memory and secondary memory, which tiers may include (but are not limited to) random access memory (RAM), 3D XPOINT memory, flash memory, magnetic storage, and the like. For example, primary memory may be assumed for the purposes of description to represent a main working memory of the system, with a higher speed but lower total capacity than a secondary memory, tertiary memory, etc.

The memory 580 may store an operating system 582 that provides computer program instructions for use by the processing unit 590 in the general administration and operation of the client device 205. The memory 580 may further include computer program instructions and other information for implementing aspects of the present disclosure. For example, in one embodiment, the memory 580 includes the browser or other application 505 and the network engine 205C. Component 205A may represent a browser that includes code executable to interact and view webpages, or may represent a dedicated application for browsing and/or purchasing items (such as garments described herein) from a particular retailer or electronic catalog service. The network engine 205C may represent code executable to format, transmit, and receive network messages, e.g., to/from the garment system 210. The data store 514 may generally store various information used by the browser/application 505, such as one or more cookies identifying a user's account or browsing session, shopping cart information, one or more photographs or the user, cached rendered garment images received from the garment system 210, etc. The data store 514 may be part of the client device 205, remote from the computing system 205, and/or may be a network-based service.

The system of FIG. 4 is one illustrative configuration of such a device, of which others are possible. For example, while shown as a single device, a system may in some embodiments be implemented as a logical device hosted by multiple physical host devices. In other embodiments, the system may be implemented as one or more virtual devices executing on a physical computing device. While described in FIG. 4 as a client device 205, similar components may be utilized in some embodiments to implement other devices shown in the environment of FIG. 2 and described elsewhere herein.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a memory configured to store specific computer-executable instructions; and
a processor in communication with the memory and configured to execute the specific computer-executable instructions to at least:
obtain a digital photograph of a user captured by a camera;
receive user selection of a plurality of garments of interest to the user;
send an indication of the plurality of garments to a remote computing system for generation of corresponding user-specific images;
obtain, from the remote computing system, generated images corresponding to at least a subset of the plurality of garments, wherein the generated images include a first generated image that depicts the user wearing a first garment of the plurality of garments of interest to the user, wherein the first generated image is generated by the remote computing system based in part on the digital photograph of the user;
generate and cause display of a user interface that includes at least (a) an initial depiction of the user in a first display position of the user interface and (b) a depiction of the first garment of the plurality of garments at a second display position of the user interface, wherein the user is not wearing the first garment in the initial depiction, wherein the second display position is in a different portion of the user interface than the first display position;
receive a scroll indication within the user interface, wherein the scroll indication represents a desire by the user to move the depiction of the first garment towards the initial depiction of the user within the user interface;
in response to the scroll indication, generate and cause display of an updated user interface that presents:
an updated depiction of the user at the first display position, wherein the updated depiction of the user comprises the first generated image that depicts the user wearing the first garment, and
a depiction of a second garment at the second display position instead of the first garment previously presented at the second display position,
wherein a visual transition is displayed between receiving the scroll indication and updating the user interface, where the visual transition comprises (a) a crossfade effect replacing the initial depiction of the user with the updated depiction of the user at the first display position, and (b) the depiction of the first garment fading out at the first display position.

2. The system of claim 1, wherein the first generated image is a composite image of the digital photograph of the user and the image of the first garment.

3. The system of claim 1, wherein the first generated image is generated by the remote computing system at least in part by warping an image of the first garment relative to a body of the user as depicted in the digital photograph of the user.

4. The system of claim 1, wherein the generated images include a different image corresponding to each of the subset of the plurality of garments, wherein each of the generated images depicts a different garment of the subset as warped to appear to be worn by a body of the user.

5. The system of claim 1, wherein the specific computer-executable instructions configure the system to wait for a threshold amount of time after a stopped scrolling event within the user interface before causing display of the updated user interface.

6. A computer-implemented method comprising:
obtaining, from a remote computing system, generated images corresponding to a plurality of garments, wherein the generated images include a first generated image that depicts a user wearing a first garment of the plurality of garments, wherein the first generated image is generated by the remote computing system based in part on a digital photograph of the user and an image of the first garment;
generating and causing display of a user interface that includes at least an initial depiction of the user in a first display position of the user interface, wherein the user is not wearing the first garment in the initial depiction;
receiving an indication of a user interaction within the user interface, wherein the indication represents a desire by the user to change which garment of the plurality of garments the user is depicted as wearing within the user interface;
in response to the indication, generating and causing display of an updated user interface that presents an updated depiction of the user at the first display position, wherein the updated depiction of the user comprises the first generated image that depicts the user wearing the first garment, wherein two or more portions of a body of the user that are not covered by the first garment in the updated depiction of the user are visually unchanged between the initial depiction of the user and the updated depiction of the user,
wherein a visual transition is displayed between receiving the indication and updating the user interface, where the visual transition comprises a crossfade effect replacing the initial depiction of the user with the updated depiction of the user at the first display position, and wherein the crossfade effect comprises at least two fades occurring simultaneously, the two fades comprising: (1) the initial depiction of the user fading out, and (2) the updated depiction of the user fading in.

7. The computer-implemented method of claim 6, wherein the visual transition further comprises the depiction of a second garment moving to a second display position that is different than the first display position within the updated user interface.

8. The computer-implemented method of claim 6 further comprising:
obtaining the digital photograph of the user from a camera of a mobile device that implements the computer-implemented method; and
sending the digital photograph of the user to the remote computing system.

9. The computer-implemented method of claim 6, wherein the first generated image is generated by the remote computing system by at least:
segmenting the digital photograph of the user; and
generating a warped version of the first garment based at least in part on a body of the user as depicted within the photograph of the user.

10. The computer-implemented method of claim 6, wherein the indication comprises a drag gesture received via a touch screen.

11. The computer-implemented method of claim 6, wherein at least a face, hands and feet are visually unchanged between the initial depiction of the user and the updated depiction of the user.

12. The computer-implemented method of claim 6, wherein the initial depiction of the user is presented with an appearance that a body shape of the user depicted in the initial depiction was cut out from paper.

13. A non-transitory computer-readable medium storing specific computer-executable instructions that, when executed by a processor, cause the processor to at least:
obtain, from a remote computing system, generated images corresponding to a plurality of garments, wherein the generated images include a first generated image that depicts a user wearing a first garment of the plurality of garments, wherein the first generated image is generated by the remote computing system based in part on a digital photograph of the user and an image of the first garment;
generate and cause display of a user interface that includes at least an initial depiction of the user in a first display position of the user interface, wherein the user is not wearing the first garment in the initial depiction;
receive an indication of a user interaction within the user interface, wherein the indication represents a desire by the user to change which garment of the plurality of garments the user is depicted as wearing within the user interface; and
in response to the indication, generate and cause display of an updated user interface that presents an updated depiction of the user at the first display position, wherein the updated depiction of the user comprises the first generated image that depicts the user wearing the first garment, wherein two or more portions of a body of the user that are not covered by the first garment in the updated depiction of the user are visually unchanged between the initial depiction of the user and the updated depiction of the user, wherein a visual transition is displayed between receiving the indication and updating the user interface, where the visual transition comprises a crossfade effect replacing the initial depiction of the user with the updated depiction of the user at the first display position, and wherein the crossfade effect comprises at least two fades occurring simultaneously, the two fades comprising: (1) the initial depiction of the user fading out, and (2) the updated depiction of the user fading in.

14. The non-transitory computer-readable medium of claim 13, wherein the user interface includes display of the first garment at a second display position, and wherein the updated user interface includes a depiction of a second garment at the second display position instead of the first garment previously presented at the second display position.

15. The non-transitory computer-readable medium of claim 14, wherein the updated user interface includes a depiction of a prior garment that was worn by the user in the initial depiction of the user, wherein the depiction of the prior garment is presented in the updated user interface on an opposite side of the first generated image as the second garment.

16. The non-transitory computer-readable medium of claim 15, wherein the depiction of the prior garment is draggable within the updated user interface, wherein a drag motion by the user from the prior garment to the first display position within the updated user interface causes the updated user interface to replace display of the updated depiction of the user at the first display position with the initial depiction of the user.

17. The non-transitory computer-readable medium of claim 13, wherein the first generated image is a composite image of the digital photograph of the user and the image of the first garment.

* * * * *